US007515551B2

(12) United States Patent
Cook et al.

(10) Patent No.: US 7,515,551 B2
(45) Date of Patent: Apr. 7, 2009

(54) TECHNIQUES FOR REDUCING ADJACENCIES IN A LINK-STATE NETWORK ROUTING PROTOCOL

(75) Inventors: David Anthony Cook, Raleigh, NC (US); Russell White, Holly Springs, NC (US); Alvaro Retana, Raleigh, NC (US); Yi Yang, Morrisville, NC (US); Madhavi Chandra, Cary, NC (US); Abhay Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 706 days.

(21) Appl. No.: 11/037,964

(22) Filed: Jan. 18, 2005

(65) Prior Publication Data

US 2006/0159082 A1 Jul. 20, 2006

(51) Int. Cl.
*H04L 12/56* (2006.01)
*H04J 1/16* (2006.01)

(52) U.S. Cl. .................. 370/254; 370/252; 370/238; 709/238

(58) Field of Classification Search ................. 370/237, 370/238, 252, 254–258, 392, 352; 709/238–242
See application file for complete search history.

(56) References Cited

U.S. PATENT DOCUMENTS 7,058,016 B1 * 6/2006 Harper .................. 370/238

7,363,387 B1 * 4/2008 Chandra et al. ............ 709/242
2002/0004843 A1 * 1/2002 Andersson et al. ......... 709/238
2004/0017801 A1 * 1/2004 Jacquemin et al. ......... 370/352
2005/0047353 A1 * 3/2005 Hares ...................... 370/255

OTHER PUBLICATIONS

Spagnolo, P., et al., OSPFv2 Wireless Interface Type, May 12, 2005, Publisher: Watersprings.org/pub/id/draft-spagnolo-manet-ospf-wireless-interface-01.txt, Published in: Internet.

* cited by examiner

*Primary Examiner*—John Pezzlo
(74) *Attorney, Agent, or Firm*—Patent Capital Group

(57) ABSTRACT

A method and apparatus are presented supporting shortest path first (SPF) routing of data packets over a network by establishing link-state data at an router. Link-state data indicates direct links between the router and a different router and establishes an adjacency relationship with the different node. Initial link-state data is stored at a first router. After the initial link-state data is stored, a hello message is received at the first router. The hello message indicates a direct connection with a different second router on one network segment. Based on the initial link-state data, it is determined whether establishing an adjacency relationship with the second router is sufficiently valuable. If not, then an adjacency relationship is not established with the second router in response to the hello message. A shortest path first routing for a data packet traversing the network is determined based on one or more adjacency relationships indicated in link-state data stored at the first router.

31 Claims, 4 Drawing Sheets

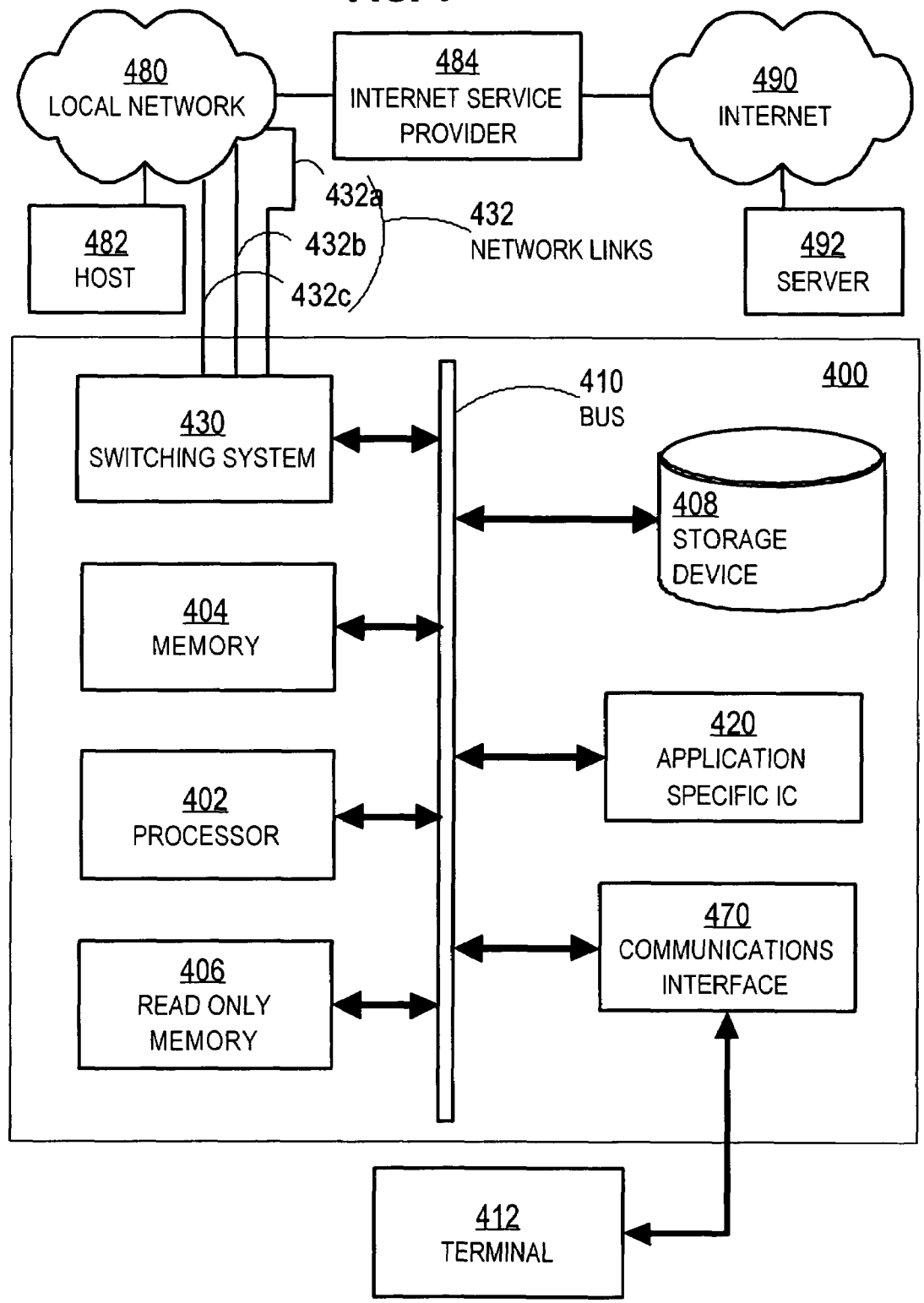

TECHNIQUES FOR REDUCING ADJACENCIES IN A LINK-STATE NETWORK ROUTING PROTOCOL

BACKGROUND OF THE INVENTION

1. Field of the Invention

The present invention relates to link-state data stored at a router for supporting shortest path first routing of data packets across a network, and in particular to techniques for optionally excluding a directly connected router from the adjacent link-state data stored at a router.

2. Description of the Related Art

Networks of general purpose computer systems connected by external communication links are well known and widely used in commerce. The networks often include one or more network devices that facilitate the passage of information between the computer systems. A network node is a network device or computer system connected by the communication links.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information defining a particular communication link between one network node and an adjacent node. The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source or destination addresses in the packet's data-link header may be updated, as necessary. However, the source and destination IP addresses typically remain unchanged as the packet is transferred from link to link in the network.

Routers and switches are network devices that determine which communication link or links to employ to support the progress of data packets through the network. A network node that determines which links to employ based on information in the internetwork header (layer 3) is called a router. Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications.

A shortest path first (SPF) method (also known as the Dijkstra algorithm) is widely known in the art for routing IP data packets on some networks. This method is described in an Internet Engineering Task Force (IETF) Request For Comment (RFC) 2328, the entire contents of which are hereby incorporated by reference as if fully set forth herein. RFC 2328 is available at the ietf.org domain of the World Wide Web. The SPF method is a link-state method. A link-state method floods routing information to all nodes on the internetwork in a link-state protocol control plane data packet; however, each router sends only the portion of the routing information that describes the state of its own links. Link-state data indicates direct links between a network node that performs routing functions (a router) and a different router (e.g., links on the same network segment, which do not involve a third router). The link-state data also indicates other characteristics of those links, such as bandwidth and congestion. According to link-state methods, each router builds a model of the entire network in its routing tables based on the link-state data received from other routers in the same.

In a link-state protocol, two routers establish an adjacency relationship between them by first verifying direct two-way communication between them over the same network segment and then synchronizing their link-state databases. A link-state protocol is an example of a routing protocol, which only exchanges control plane messages used for routing data packets sent in a different routed protocol (e.g., IP). Once the adjacency relationship is established, the two routers are called peers. The peers announce their adjacency relationship in periodic messages to other nodes in the network. For example, in the Open Shortest Path First (OSPF) protocol, the adjacency relationships are advertised in "Hello" messages and Link-state Advertisement (LSA) messages sent within a partitioned area of a larger network. The adjacency relationships among peers are used in all shortest path first computations by all routers in the partitioned area of the larger network. During a reliable flooding stage, each router is required to ensure that each of its peers has received its link-state data through a mechanism that includes an acknowledgement message and, sometimes, a retransmission message. On multi-access network segments that include more than two routers, the OSPF protocol selects a designated router (DR). The DR is responsible for generating LSAs for the entire multi access network segment.

As a consequence, resources on each router and many other network nodes are consumed for each peer with which the router establishes or maintains an adjacency relationship. The resources consumed by the router include: memory to store the peer and the characteristics of the link with the peer; processor time to compute the SPF based, at least in part, on the adjacency with that peer; processor time and link bandwidth for sending, receiving and processing routing information involving the peer; and corrective messaging and processing iterations to ensure that the same solutions are obtained at all peers (network convergence).

Maintaining an adjacency relationship with a peer provides the benefit of reaching network nodes connected more directly to that peer than to the router itself. Additional peers provide redundant paths to some network nodes and thus provide increased network reliability.

Many link-state protocols require each router to establish an adjacency relationship with every other router to which it becomes directly connected on the same network segment. As the number and types of network nodes that communicate directly with a network node increase, network performance can deteriorate as ever more node resources are consumed to establish, maintain, and correct adjacency relationships. The problems are exacerbated as mobile, wireless routers frequently enter and leave direct communications with fixed routers and with each other. Numerous mobile routers forming a mobile ad hoc network (MANET) are already proposed and anticipated. In such MANETs, at least some routers are expected to become inundated with traffic and computations to establish the mandatory adjacency relationships and to re-compute routing tables based on frequent changes in the adjacency relationships. As a consequence, many link-state protocols are not sufficiently scalable to handle numerous mobile routers.

In one approach, the link-state protocol is modified to use periodic advertisements for new peers, rather than synchronization involving complete database exchange between peers. Neighbor discovery still occurs as in current link-state protocols, but the link-state data for the routing information is learned over time. For example, OSPFv2 Wireless Interface Type, described in RFC 2386, uses periodic advertisements to eliminate "the formation of full adjacencies on wireless interfaces . . . no database synchronization is performed."

While this form of neighbor reduction is suitable for some purposes, OSPFv2 sill requires eventual adjacency for direct (two-way) links. This can still be a problem for a large number of wireless network nodes temporarily on two-way links with a network node.

Another disadvantage of this approach is that the route distribution mechanism is changed, because routes are learned over time instead of being distributed in reliable flooding. Therefore this approach is not backward compatible with earlier versions of the protocol.

Based on the foregoing, there is a clear need for techniques for establishing and maintaining link-state data and shortest path first routing that does not suffer the disadvantages of prior art approaches. In particular, there is a need for techniques that do not form an adjacency relationship with every node that comes into direct link with a network node and that are still backward compatible for route distribution.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a block diagram that illustrates a computer system upon which an embodiment of the invention may be implemented.

DETAILED DESCRIPTION

Figure 1:
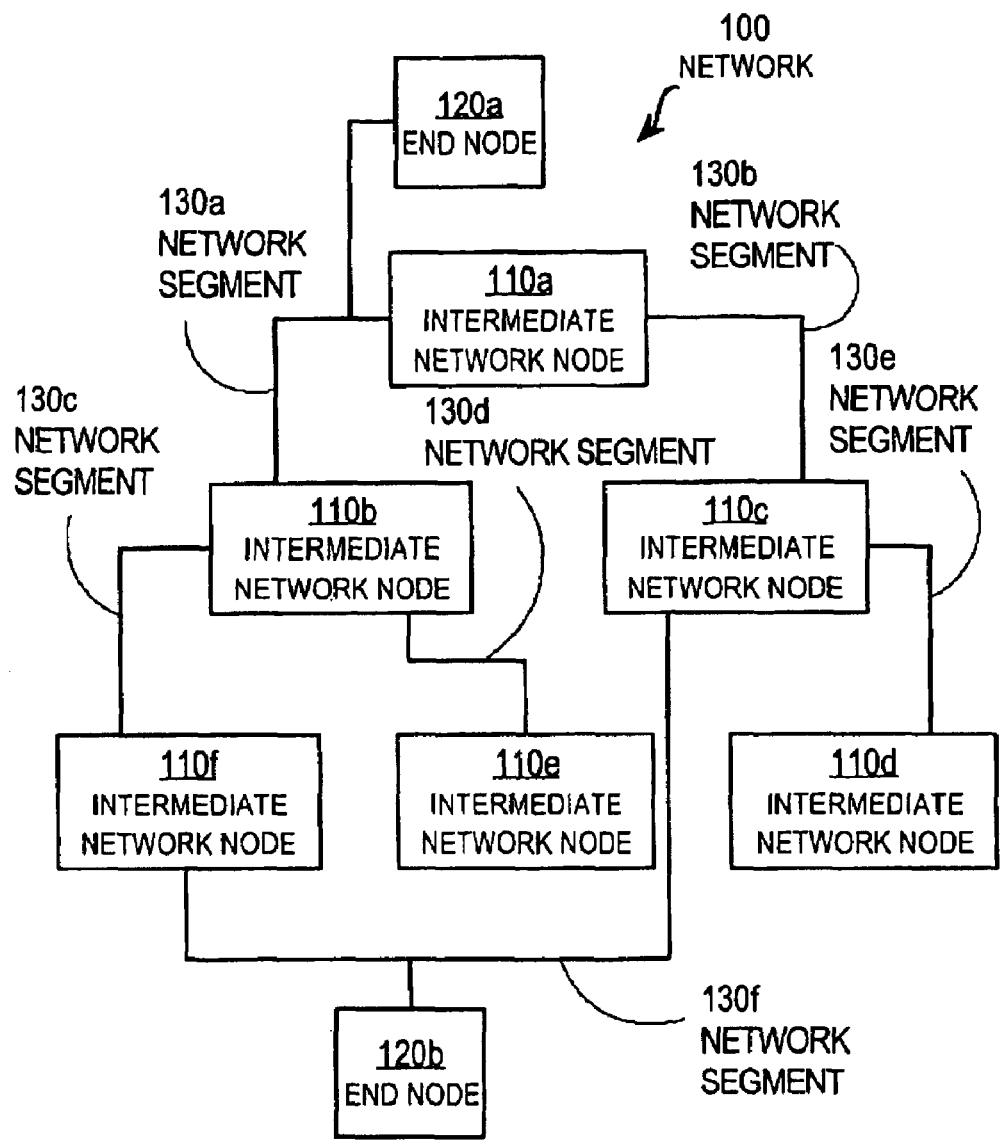
FIG. 1 is a block diagram that illustrates a network in which an embodiment of the invention may be implemented.

Techniques are described for supporting shortest path first (SPF) routing of data packets over a network by storing a reduced amount of link-state data at a router. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

2.0 Functional Overview

Techniques are provided for supporting shortest path first (SPF) routing of data packets over a network by storing a reduced amount of link-state data at a router. According to a first set of embodiments, a method includes storing initial link-state data at a first router and then receiving a hello message at the first router. The hello message indicates a connection with a different second router on one network segment. Based on the initial link-state data, it is determined whether establishing an adjacency relationship with the second router is sufficiently valuable. If it is not sufficiently valuable, then an adjacency relationship with the second router is not established in response to the hello message. A routing table for shortest path first routing of a data packet traversing the network is determined based on an adjacency relationship indicated in link-state data stored at the first router In some embodiments of the first set, if establishing an adjacency relationship with the second router is sufficiently valuable, then the adjacency relationship with the second router is established by storing link-state data for a link with the second router. It is also determined whether maintaining an adjacency relationship with a third router is sufficiently valuable. If not, then an adjacency relationship with the third router is disestablished in response to the hello message, for example by deleting link-state data describing a link between the first router and the third router.

In some embodiments of the first set, determining whether establishing an adjacency relationship with the second router is sufficiently valuable includes determining whether the second router provides a path to a network address that can not be reached otherwise. If the second router provides a path to a network address that can not be reached otherwise, then establishing an adjacency relationship with the second router is sufficiently valuable. In some of these embodiments, the step of determining that the second router provides a path to a network address that can not be reached otherwise includes determining that the first router and the second router are not already transitively synchronized. The first router and the second router are transitively synchronized when the link-state data stored on the first router includes data from a link-state advertisement control plane message received from the second router.

In some embodiments of the first set, determining whether establishing an adjacency relationship with a candidate router is sufficiently valuable includes determining that a certain network address can only be reached through a particular number of peers other than the candidate router. In this context, a peer is a router with which the first router has a current adjacency relationship. It is determined whether the particular number of peers is less than a target number, such as one or two, that supports a particular degree of redundancy, such as none or minimal, respectively. If it is determined that the particular number of peers is less than the target number, then it is determined that establishing an adjacency relationship is sufficiently valuable.

In some embodiments of the first set, determining whether an adjacency relationship with a candidate router is sufficiently valuable includes determining an indirect path cost and a link cost. The indirect path cost indicates a measure of network resources consumed along an indirect path to the candidate router. The link cost indicates a measure of network resources consumed along a direct path to the candidate router. It is determined whether a difference of the indirect cost minus the link cost exceeds a threshold cost difference. If it is determined that the difference exceeds the threshold cost difference, then an adjacency relationship with the second router is sufficiently valuable.

In other sets of embodiments, an apparatus and a computer-readable medium are used to implement steps of the above methods.

In the following sections, embodiments of the invention are described in the context of link-states for routers using the OSPF protocol to form routing tables to be used during routing IP data packets, but the invention is not limited to this context. In other contexts, the same or other link-state routing protocols are used in routers or in other intermediate network nodes or end nodes that perform routing functions for data packets of the same or different routed protocols.

2.0 SPF Routing Overview

FIG. 1 is a block diagram that illustrates a network 100 in which an embodiment of the invention may be implemented. A computer network is a geographically distributed collection of interconnected sub-networks (e.g., network segments 130a, 130b, 130c, 130d, 130e, 130f, collectively referenced hereinafter as network segments 130) for transporting data between nodes, such as computer hosts. A local area network (LAN) is an example of such a sub-network. The network's topology is defined by an arrangement of end nodes (e.g., end nodes 120a, 120b collectively referenced hereinafter as end nodes 120) that communicate with one another, typically through one or more intermediate network nodes (e.g., intermediate network nodes 110a, 110b, 110c, 110d, 110e, 110f, collectively referenced hereinafter as intermediate network nodes 110), such as a routers or switches, that facilitate routing data between network segments 130 and end nodes 120. As used herein, an end node 120 is a node that is configured to originate or terminate communications over the network. In contrast, an intermediate network node 102 facilitates the passage of data between end nodes. A network segment 130 is a portion of network 100 without an intermediate network node 110.

Although, for purposes of illustration, there are depicted two end nodes 120, six network segments 130 and six intermediate network nodes 110, in other embodiments, there are more or fewer end nodes, network segments, and intermediate network nodes. Furthermore, for purposes of illustration, each network segment 130 lies between two intermediate network nodes 110; but, in other embodiments, one or more network segments connect to more or fewer intermediate network nodes.

The number of network segments that are transited for communications between two nodes are called hops. Thus, there is one hop from node 110a to node 110b; there are two hops from node 110a to node 110f, and there are three hops from node 110b to node 110d.

As is well known in the art, each intermediate network node 110 stores a link-state database that describes the links of each intermediate network node 110 in the network 100. The link-state data for each link includes: an identifier for the link, for example a router identifier and a media access control (MAC) address of a router interface connected to the link; an identifier for another intermediate network node on that link, if any; a range of internetwork addresses for the network segment connected to that link; and sometimes a metric of performance of the link, such as bandwidth, number of end nodes, percent utilization, or some combination of these metrics. In the OSPF protocol, the link-state databases describe the links in a partitioned portion called an area of a larger network.

The link-state database is built based on link-state advertisements (LSAs) received at each intermediate network node 110. Link-state advertisements are control plane data packets sent by an intermediate network node 110 that describes the link-state of its own links, according to a link-state protocol, such as OSPF. An intermediate network node's own link-state data is determined by a discovery and synchronization process.

For example, according to OSPF, when intermediate network node 110a is connected to network segment 130a, the intermediate network node 110a sends a Hello message over network segment 130a as part of a Discovery phase. This Hello message is received by intermediate network node 110b and used by node 110b to add node 110a to the link-state data associated with the link to network segment 130a. Based on response messages in the Discovery phase, node 110a adds node 110b to the link-state data associated with the link to network segment 130a. According to OSPF, the two nodes 110a, 110b exchange Database Description control messages to synchronize their link-state databases so that the link-state databases on both are identical. After synchronization, the two synchronized nodes 110a, 110b (e.g., two routers) are fully adjacent.

During reliable flooding, each intermediate node (or designated router of multi access network segments) in an area sends LSA control messages for receipt by every other intermediate network node in the area. The LSA from a particular node (e.g., from node 110a) contains the link-state data only for links to that node (e.g., links to network segments 130b, 130c). The LSAs received from each intermediate network node 110 (e.g., a router) are stored by the receiving node (e.g., a router) in association with an identifier for the sending node. Each router builds a router LSA, which is then flooded to it's adjacent neighbors, and throughout the network, hop by hop, becoming a part of the link-state database. The router LSA is also inserted in the local link-state database, and used as the root of an SPF tree.

When two intermediate network nodes 110 are one hop apart and have the same link-state database, the two nodes are said to be 1-hop synchronized. It can be determined if two nodes are 1-hop synchronized because each will appear in an LSA received from the other. For example, after synchronization, nodes 110a and 110b are 1-hop synchronized.

When two intermediate nodes are two hops apart and are each 1-hop synchronized with the same third node, the two nodes are said to be 2-hop synchronized. For example, after synchronization, nodes 110a and 110f are 2-hop synchronized because each is 1-hop synchronized with node 110b. It is expected that nodes 110*a* and 110*f* become 2-hop synchronized at a time later than nodes 110*a* and 110*b* become 1-hop synchronized. One way to determine whether two nodes are 2-hop synchronized is by examining their router-LSA data. If the same third node (e.g., node 110*b*) is found in the router-LSA data of both nodes (e.g., nodes 110*a*, 110*f*), then the two nodes (e.g., 110*a*, 110*f*) are 2-hop synchronized.

When two intermediate nodes are more than two hops apart and are each 1-hop synchronized or two-hop synchronized with the same third node, the two nodes are said to be transitively synchronized. For example, after synchronization, nodes 110*b* and 110*d* are transitively synchronized because nodes 110*b* and 110*d* are three hops apart, node 110*b* is 1-hop synchronized with node 110*a* and node 110*d* is 2-hop synchronized with the same node, node 110*a*. It is expected that nodes 110*b* and 110*d* become transitively synchronized at a time later than nodes 110*a* and 110*d* become 2-hop synchronized. Two nodes are also said to be transitively synchronized if both are transitively synchronized to the same third node.

3.0 Method for Reducing Link-State Data at a Router

According to embodiments of the invention, not every pair of nodes directly connected to the same network segment become peers. It is first determined whether there is sufficient value in becoming peers and establishing the adjacency relationship, exchanging the information used in the SPF routing algorithm. In general, a newly discovered network node is added as a fully adjacent peer if it provides a path for an existing network node to reach a network address not otherwise reachable from the existing network node. In some embodiments, a newly discovered network node is also added as a peer if it provides a desired degree of redundancy in reaching certain addresses, as described in more detail below. In some embodiments, a newly discovered network node is also added as a peer if it provides a sufficient cost benefit, as also described in more detail below. Embodiments of the invention thus intelligently identify which directly connected intermediate network nodes to peer with, by determining which of them provide sufficient benefit to the network. The total network overhead is reduced while maintaining full reachability.

Figure 2:
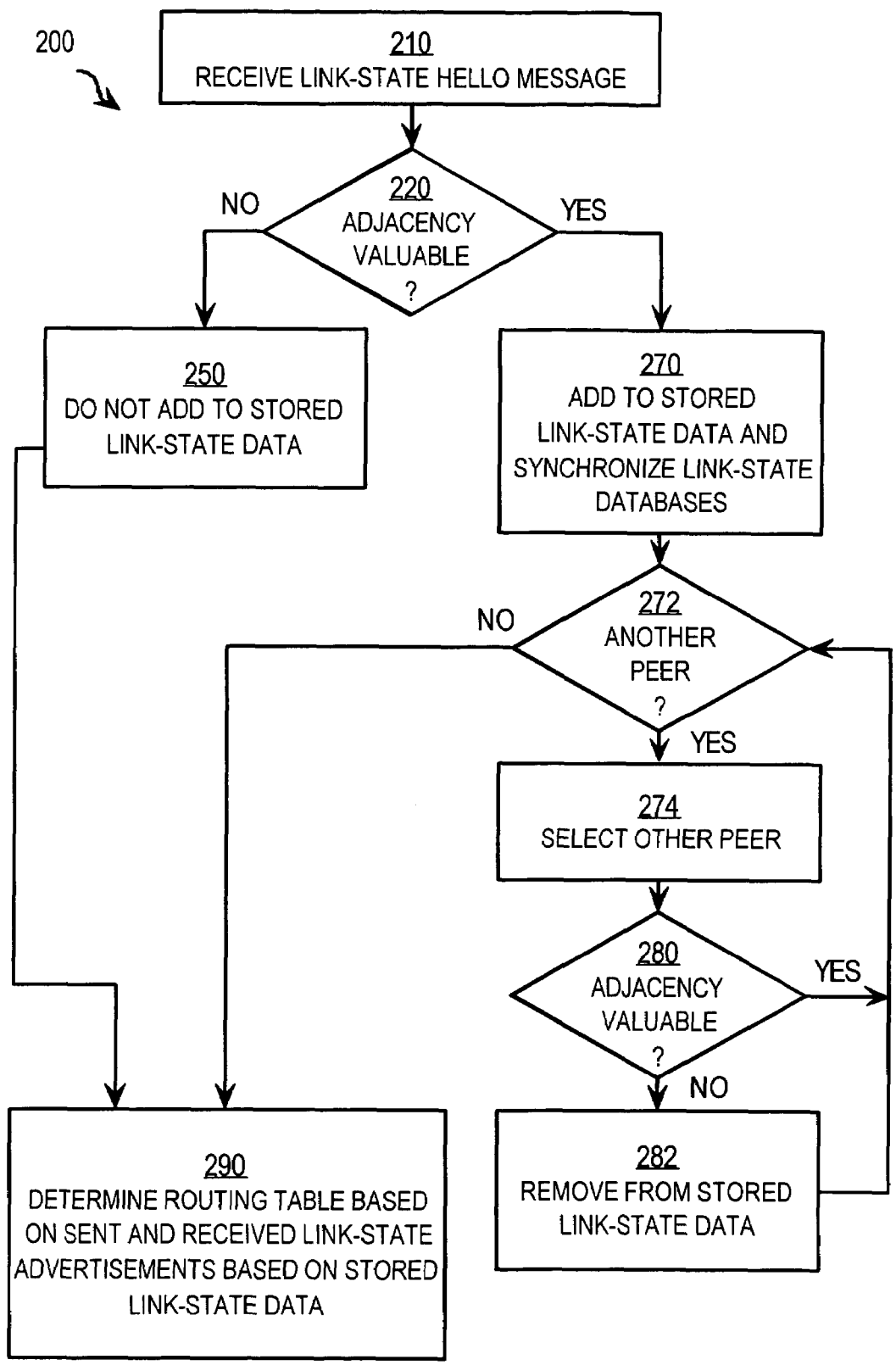
FIG. 2 is a flow diagram that illustrates at a high level a method to route data packets over a network based on a reduced set of adjacency relationships, according to an embodiment.

FIG. 2 is a flow diagram that illustrates at a high level a method 200 for forming a routing table used to route data packets over a network based on a reduced set of adjacency relationships, according to an embodiment. Although steps are shown in a particular order in FIG. 2 and following flow diagrams for purposes of illustration, in other embodiments one or more steps may be performed in a different order, or overlap in time, or be omitted. Any method may be used to implement method 200. For example, in some embodiments instructions for a general purpose processor (i.e., a central processing unit) are stored on computer-readable media and executed by one or more processors. In some embodiments, a state machine is constructed that implements some or all of the steps described below.

In step 210, a link-state protocol hello message is received on a particular link at a receiving router. The hello message announces the presence of a new router on that particular link. As is well known in the art, when a router is first powered up and connected to a network, it sends out a hello control plane message as part of the discovery phase of a link-state protocol. For example, during step 210 an OSPF protocol Hello message is received. Step 210 includes determining that the hello message is from a new router that is not already in the link-state database of the receiving router indicating a direct connection between the receiving router and the new router. Methods for making this determination are already well known in the art.

In step 220 it is determined whether establishing an adjacency with the new router is valuable. Methods for making this determination are described in more detail below with reference to FIG. 3. If establishing adjacency is not deemed worthwhile control passes to step 250. If establishing adjacency is deemed worthwhile control passes to step 270.

In step 250, unlike prior art approaches, the new router is not added to the link-state database as a peer of the receiving router, even though there is a direct connection. Thus there is not a synchronization of the link-state databases between the new router and the receiving router. Control passes to step 290.

In step 290, a routing table is generated at the receiving router based on the link-state data at the receiving router, e.g., by using the SPF method, well known in the art. Any method known in the art at the time the method 200 is implemented may be used for forming the routing table. In the illustrated embodiment, step 290 includes sending LSAs, e.g., on a periodic basis or during reliable flooding or both. If control passed through step 250, the LSAs and the routing table do not include a direct link between the receiving router and the new router. If control passed through step 270, the LSAs and this routing table do include a direct link between the receiving router and the new router. Step 290 includes routing one or more data packets based on the routing table. Any method known in the art at the time the method 200 is implemented may be used for using the routing table. For example, an IP datagram is routed based on the routing table according to the SPF method.

If it is determined in step 220 that establishing adjacency is deemed worthwhile, then control passes to step 270. In step 270, the new router is added to the link-state database as a peer of the receiving router. In some embodiments, this includes testing the link for two-way communications with the new router. Step 270 includes synchronization of the link-state databases between the new router and the receiving router.

In some embodiments, control then passes to step 290. In an illustrated embodiment, control passes first to step 272 to consider demoting a peer of the receiving router already in the link-state database.

In step 272, it is determined whether there is another peer of the receiving router in the link-state database, which peer ought to be considered for demotion but has not yet been considered for demotion. In the illustrated embodiments, all other peers are considered for demotion. In some embodiments only some peers of the receiving router are considered for demotion, based on one or more network metrics. If there is no other such peer to be considered, control passes to step 290 to determine the routing table and use it to route data packets. If there is another peer to be considered for demotion, control passes to step 274.

In step 274, another peer is selected to be considered for demotion. Any method may be used to select the next peer for demotion.

In step 280 it is determined whether maintaining an adjacency with the peer is valuable. Methods for making this determination, as stated above for step 220, are described in more detail below with reference to FIG. 3. If maintaining adjacency is deemed worthwhile control passes back to step 272 to consider another peer, if any. If maintaining adjacency is not deemed worthwhile control passes to step 282.

In step 282, the peer under consideration is demoted by removing it as a directly connected router from the link-state data of the receiving router. Control then passes to step 272 to consider demoting another peer, if any. Eventually, new routing tables determined in step 290 are built that exclude the removed peer (called a demoted peer, herein) from the direct links to the receiving router. In some embodiments, no more than one peer is demoted when a new peer is added and control passes from step 282 to step 290.

In some embodiments, control is passed to step 272 at the discretion of a network administrator. In some embodiments, called herein preemptive embodiments, the routers are configured to pass control to step 272 automatically. In various embodiments, control passes to step 272 whenever the link costs or levels of redundancy, described in more detail below, change at the router or anywhere in the network. In various embodiments, a dampening mechanism is employed during step 272, step 274, step 280, or step 282 to avoid resetting adjacencies too often. In various embodiments, step 272, step 274, step 280, or step 282 includes a waiting period to ensure that the new adjacency relationship established in step 270 is stable before a peer is selected for demotion. This is done to avoid oscillations of establishing and disestablishing adjacencies for a particular new router and one or more peers, such as might occur when a wireless router moves along an edge of a communication range with the receiving router.

Figure 3:
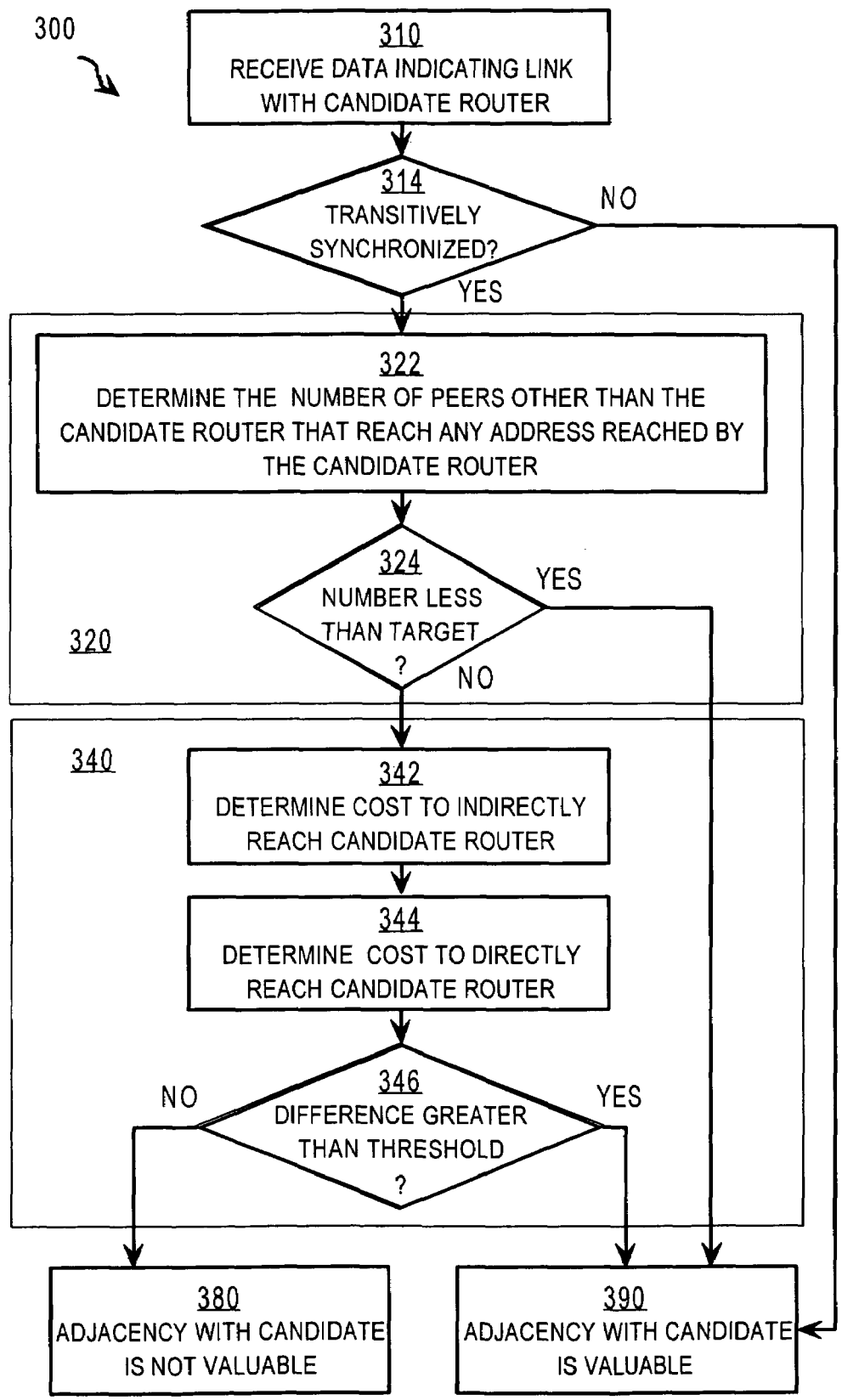
FIG. 3 is a flow diagram that illustrates a method for determining whether an adjacency relationship with a candidate router is valuable enough to form an adjacency relationship, according to an embodiment.

FIG. 3 is a flow diagram that illustrates a method 300 for determining whether an adjacency relationship with a candidate router is valuable, as in steps 220 and 280 in method 200, according to an embodiment. Here the candidate router is either the new router announced by the hello message received during step 210, or a current peer that is being considered for demotion as selected during step 274, described above.

In step 310, data is received that indicates a link with the candidate router, e.g., the new router or the current peer considered for demotion.

In step 314, it is determined whether the candidate router and the receiving router are already transitively synchronized. If the two routers are transitively synchronized, then a peering relationship with the candidate router does not provide reachability to any new destinations and control passes to step 320 to determine whether the candidate router supports a desired level of redundancy. However, if the two routers are not transitively synchronized, then a peering relationship is desired to reach the new destinations. Therefore, adjacency is valuable and control passes to step 390 to so conclude. Step 314 is omitted in some embodiments of step 280 for existing peers, because the receiving router's peers are always at least transitively synchronized with the receiving router. They are in fact always 1-hop synchronized with the receiving router. Therefore control always passes to step 320 for current peers in the illustrated embodiment.

In an illustrated embodiment of step 314, it is determined whether the link-state database of the receiving router includes an LSA from the candidate router and whether the LSA from the candidate router has been used to build a SPF tree as part of the well-known SPF method. A routing bit in the link-state database indicates whether a particular LSA has been used in the calculation of the SPF tree within an OSPF area. If both determinations are true, then the two routers are transitively synchronized, and the candidate router does not provide a path with new network addresses. However, if either determination is untrue, then the two routers are not transitively synchronized, and the candidate router does provide a path with new network addresses.

In step 320, it is determined whether the candidate router provides any additional path to some addresses in order to satisfy a desired level of redundancy. Step 320 includes step 322 and step 324. Step 320 includes defining a level of redundancy, such as during configuration of the router. In an illustrated embodiment, a level of redundancy is based on a target number of paths that are desired for reaching any destination. For no redundancy requirement, the target is 1; for minimal redundancy, the target is 2. In some embodiments, step 320 is omitted. In some embodiments, step 320 follows step 340, described below.

In step 322 it is determined whether the candidate router provides a path to some addresses that are also provided by a number of other peers. Any method may be used. In an illustrated embodiment, step 322 includes determining the number of direct links to current peers that must fail before a path to the candidate router is lost. In the illustrated embodiment, this number is determined by eliminating a link to a next hop and recalculating SPF.

In step 324, the number of peers that provide paths to the candidate router is compared to the target. If the number is less than the target, then an adjacency relationship with the candidate is valuable and control passes to step 390. Otherwise, control passes to step 340.

It is assumed for purposes of illustration that the target number of paths is 2, for minimal redundancy. It is further assumed for purposes of illustration that a receiving router positioned as intermediate node 110b is already peered with routers positioned as intermediate nodes 110f, 110e and then receives a hello message from a new router positioned as intermediate node 110a. During step 322 a SPF route to node 110a is computed that is made up of hops to 110f to 110c to 110a. If the first hop to 110f is dropped, there is no path to 110a (excluding the candidate direct link to 110a). Therefore the number of additional paths (also the number of peers that reach an address reached by 110a) is 1. Since the target is 2, the number is less than the target and control passes to step 390 to conclude that adjacency with the candidate router is valuable. If it is assumed that redundancy is not desired, for further illustration, then the target is 1, the number of paths is not less than the target in step 324 and control passes to step 340. The three hop path to 110a using peer 110f is sufficient.

In step 340, it is determined whether the candidate router provides a sufficient routing cost benefit to justify being a peer of the receiving router, even if the candidate router is not needed to satisfy a target level of redundancy. Step 340 includes step 342, step 344 and step 346. Step 340 includes defining a threshold of cost benefit, such as during configuration of the router. If a cost of a direct path to the candidate peer is sufficiently below a cost of an indirect path (i.e., a path that does not use the direct link), it may be beneficial to form an adjacency relationship with the candidate router. The extra cost of the adjacency relationship with the direct link is offset by avoiding the costs of sub-optimal routing. By setting the threshold of cost benefit to a maximum allowable cost difference between the cost of the indirect path and the cost of the direct path, a degree of sub-optimal routing can be controlled. In some embodiments, step 340 is omitted. In embodiments in which step 340 is omitted and step 320 is included, control passes from step 324 to step 380 if it is determined in step 324 that the number of additional paths is less than the target number. In embodiments in which both step 340 and 320 are omitted, control passes from step 314 to step 380 if it is determined in step 324 that the two routers are already transitively synchronized.

In step 342, a cost to indirectly reach the candidate router is determined. Any cost function may be used based on any combination of routing metrics for a path. Routing metrics include, but are not limited to, path length (e.g., number of hops), reliability (e.g., percent of time available), delay (e.g., travel time and processing time), bandwidth (bits per second transmitted at lowest bandwidth link along path), load (percent of bandwidth consumed by current traffic) and communication cost (amount of money expended to maintain the links along that path).

In step 344, a cost to directly reach the candidate router is determined. Any cost function may be used based on any combination of routing metrics for a path. In an illustrated embodiment, the same cost function is used in step 344 as is used in step 342, except that the path input is the direct path from the receiving router to the candidate router.

In step 346, it is determined whether the difference is greater than the threshold. If so, control passes to step 390, which concludes that adjacency with the candidate router is valuable. If not, control passes to step 380, which concludes that adjacency with the candidate router is not valuable.

It is assumed for purposes of illustration that, as described above, a receiving router positioned as intermediate node 110b is already peered with routers positioned as intermediate nodes 110f, 110e and then receives a hello message from a new router positioned as intermediate node 110a. It is further assumed for purposes of illustration that the target number of paths is 1, for no redundancy, so that in the example above, control passes to step 340. It is further assumed for illustrating this example, that the cost function is path length in number of hops and that the threshold difference is two hops.

In this example, during step 342 an indirect route to node 110a is computed to have a path length of 3 hops (to nodes 110f, 110c, 110a), as described above. During step 344, it is determined that the direct route has a path length of 1 hop. In step 346 it is determined that the cost difference of 2 hops is not greater than the threshold of 2 hops, therefore control passes to step 380 to conclude that adjacency is not valuable. That is, the two hop savings by forming an adjacency with router at 110a is not sufficient, in this example, to warrant the costs of establishing or maintaining the adjacency relationship with the router at 110a.

In various embodiments, the threshold cost or level of redundancy, or both, are different for existing peers during step 280 than for new routers during step 220.

The techniques described here provide an intelligent way to limit the number of adjacency relationships in a network. The routers excluded from the adjacency relationship are those that provide little benefit to the network. Thus network resource are not wasted in peering with such routers. At the same time, no router is excluded that is needed to reach any network address, thus reachability is not diminished. These techniques thus improve network performance by reducing excess overhead caused by having too many adjacencies. Unlike some prior approaches, these techniques place restrictions on the number of adjacencies and do not require a change to the OSPF standard.

4.0 Implementation Mechanisms—Hardware Overview

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, nonvolatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

100721 Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention. Thus, embodiments of the invention are not limited to any specific combination of hardware and software.

The signals transmitted over network link 432 and other networks through communications interfaces such as interface 470, which carry information to and from computer system 400, are exemplary forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for supporting shortest path first (SPF) routing of data packets over a network by establishing link-state data at an router, wherein link-state data indicates direct links between the router and a different router and establishes an adjacency relationship with the different router, comprising the steps of:
   storing first link-state data at a first router;
   after storing the first link-state data, receiving, at the first router, a hello message that indicates a direct connection with a different second router on one network segment;
   determining whether establishing an adjacency relationship with the second router is sufficiently valuable based on the first link-state data;
   if it is determined that establishing an adjacency relationship with the second router is not sufficiently valuable, then not establishing an adjacency relationship with the second router in response to the hello message; and
   determining a routing table for shortest path first routing of a data packet traversing the network based on an adjacency relationship indicated in link-state data stored at the first router.

2. A method as recited in claim 1, further comprising, if it is determined that establishing an adjacency relationship with the second router is sufficiently valuable, then performing the steps of:
   establishing an adjacency relationship with the second router by storing link-state data for a link with the second router;
   determining whether maintaining an adjacency relationship with a third router different from the first router and the second router is sufficiently valuable; and
   if it is determined that maintaining the adjacency relationship with the third router is not sufficiently valuable, then disestablishing an adjacency relationship with the third router in response to the hello message.

3. A method as recited in claim 1, said step of determining whether establishing an adjacency relationship with the second router is sufficiently valuable further comprising the steps of:
   determining whether the second router provides a path to a network address that can not be reached without the second router; and
   if it is determined that the second router provides a path to a network address that can not be reached without the second router, then determining that establishing an adjacency relationship with the second router is sufficiently valuable.

4. A method as recited in claim 3, said step of determining whether the second router provides a path to a network address that can not be reached without the second router further comprising the step of determining whether the first router and the second router are not already transitively synchronized, wherein the first router and the second router are transitively synchronized when the link-state data stored on the first router includes data from a link-state advertisement control plane message received from the second router.

5. A method as recited in claim 3, said step of determining whether establishing an adjacency relationship with the second router is sufficiently valuable further comprising the step of, if it is determined that the second router provides a path only to one or more network addresses that can be reached without the second router, then determining that establishing an adjacency relationship with the second router is not sufficiently valuable.

6. A method as recited in claim 1, said step of determining whether establishing an adjacency relationship with the second router is sufficiently valuable further comprising the steps of:
   determining that a network address can only be reached through a particular number of peers other than the second router, wherein a peer is a router with which the first router has an adjacency relationship;
   determining whether the particular number of peers is less than a target number that supports a particular degree of redundancy; and
   if it is determined that the particular number of peers is less than a target number, then determining that establishing an adjacency relationship with the second router is sufficiently valuable.

7. A method as recited in claim 6, said step of determining whether establishing an adjacency relationship with the second router is sufficiently valuable further comprising the steps of, if it is determined that the particular number of peers is not less than a target number, then determining that establishing an adjacency relationship with the second router is not sufficiently valuable.

8. A method as recited in claim 1, said step of determining whether establishing an adjacency relationship with the second router is sufficiently valuable further comprising the steps of:
   determining an indirect cost that indicates a measure of network resources consumed along a lowest cost indirect path to the second router;
   determining a link cost that indicates a measure of network resources consumed along a direct path to the second router;
   determining whether a difference of the indirect cost minus the link cost exceeds a threshold cost difference; and
   if it is determined that the difference exceeds the threshold cost difference, then determining that establishing an adjacency relationship with the second router is sufficiently valuable.

9. A method as recited in claim 8, said step of determining whether establishing an adjacency relationship with the second router is sufficiently valuable further comprising the step of, if it is determined that the difference does not exceed the threshold cost difference, then determining that establishing an adjacency relationship with the second router is not sufficiently valuable.

10. A method as recited in claim 2, said step of determining whether maintaining an adjacency relationship with the third router is sufficiently valuable further comprising the steps of:
   determining whether the third router provides a path to a network address that can not be reached without the third router; and
   if it is determined that the third router provides a path to a network address that can not be reached without the third router, then determining that maintaining an adjacency relationship with the third router is sufficiently valuable.

11. A method as recited in claim 2, said step of determining whether maintaining an adjacency relationship with the third router is sufficiently valuable further comprising the steps of:
   determining that a network address can only be reached through a particular number of peers other than the third router, wherein a peer is a router with which the first router has an adjacency relationship;
   determining whether the particular number of peers is less than a target number that supports a particular degree of redundancy; and
   if it is determined that the particular number of peers is less than a target number, then determining that maintaining an adjacency relationship with the third router is sufficiently valuable.

12. A method as recited in claim 2, said step of determining whether maintaining an adjacency relationship with the third router is sufficiently valuable further comprising the steps of:
   determining an indirect path cost that indicates a measure of network resources consumed along a least costly indirect path from the first router to the third router;
   determining a link cost that indicates a measure of network resources consumed along a direct path to the second router;
   determining whether a difference of the indirect cost minus the link cost exceeds a threshold cost difference; and
   if it is determined that the difference exceeds the threshold cost difference, then determining that maintaining an adjacency relationship with the third router is sufficiently valuable.

13. A computer-readable volatile and non-volatile medium carrying one or more sequences of instructions for supporting shortest path first (SPF) routing of data packets over a network by establishing link-state data at an router, wherein link-state data indicates direct links between the router and a different router and establishes an adjacency relationship with the different router, and wherein execution of the one or more sequences of instructions by one or more processors causes the one or more processors to perform the steps of:
   storing initial link-state data at a first router;
   after storing the initial link-state data, receiving, at the first router, a hello message that indicates a direct connection with a different second router on one network segment;
   determining whether establishing an adjacency relationship with the second router is sufficiently valuable based on the initial link-state data;
   if it is determined that establishing an adjacency relationship with the second router is not sufficiently valuable, then not establishing an adjacency relationship with the second router in response to the hello message; and
   determining a routing table for shortest path first routing of a data packet traversing the network based on an adjacency relationship indicated in link-state data stored at the first router.

14. A computer-readable medium as recited in claim 13, wherein execution of the one or more sequences of instructions further causes the one or more processors to perform the steps of, if it is determined that establishing an adjacency relationship with the second router is sufficiently valuable, then:
   establishing an adjacency relationship with the second router by storing link-state data for a link with the second router;
   determining whether maintaining an adjacency relationship with a third router different from the first router and the second router is sufficiently valuable; and
   if it is determined that maintaining the adjacency relationship with the third router is not sufficiently valuable, then disestablishing an adjacency relationship with the third router in response to the hello message.

15. A computer-readable medium as recited in claim 13, said step of determining whether establishing an adjacency relationship with the second router is sufficiently valuable further comprising the steps of:
   determining whether the second router provides a path to a network address that can not be reached without the second router; and
   if it is determined that the second router provides a path to a network address that can not be reached without the second router, then determining that establishing an adjacency relationship with the second router is sufficiently valuable.

16. A computer-readable medium as recited in claim 15, said step of determining whether the second router provides a path to a network address that can not be reached without the second router further comprising the step of determining whether the first router and the second router are not already transitively synchronized, wherein the first router and the second router are transitively synchronized when the link-state data stored on the first router includes data from a link-state advertisement control plane message received from the second router.

17. A computer-readable medium as recited in claim 13, said step of determining whether establishing an adjacency relationship with the second router is sufficiently valuable further comprising the steps of:
   determining that a network address can only be reached through a particular number of peers other than the second router, wherein a peer is a router with which the first router has an adjacency relationship;
   determining whether the particular number of peers is less than a target number that supports a particular degree of redundancy; and
   if it is determined that the particular number of peers is less than a target number, then determining that establishing an adjacency relationship with the second router is sufficiently valuable.

18. A computer-readable medium as recited in claim 13, said step of determining whether establishing an adjacency relationship with the second router is sufficiently valuable further comprising the steps of:
   determining an indirect cost that indicates a measure of network resources consumed along a lowest cost indirect path to the second router;
   determining a link cost that indicates a measure of network resources consumed along a direct path to the second router;

determining whether a difference of the indirect cost minus the link cost exceeds a threshold cost difference; and if it is determined that the difference exceeds the threshold cost difference, then determining that establishing an adjacency relationship with the second router is sufficiently valuable.

19. An apparatus for supporting shortest path first (SPF) routing of data packets over a network by establishing link-state data at an router, wherein link-state data indicates direct links between the router and a different router and establishes an adjacency relationship with the different router, comprising:

means for storing initial link-state data at a first router;

means for receiving, at the first router, a hello message that indicates a direct connection with a different second router on one network segment;

means for determining whether establishing an adjacency relationship with the second router is sufficiently valuable based on the initial link-state data;

means for not establishing an adjacency relationship with the second router in response to the hello message, if it is determined that establishing an adjacency relationship with the second router is not sufficiently valuable; and means for determining a routing table for shortest path first routing of a data packet traversing the network based on an adjacency relationship indicated in link-state data stored at the first router.

20. An apparatus for supporting shortest path first (SPF) routing of data packets over a network by establishing link-state data at an router, wherein link-state data indicates direct links between the router and a different router and establishes an adjacency relationship with the different router, comprising:

a network interface that is coupled to a network for communicating therewith a data packet;

one or more processors;

a computer-readable volatile and non-volatile medium; and one or more sequences of instructions stored in the computer-readable medium, which, when executed by the one or more processors, causes the one or more processors to carry out the steps of:

storing initial link-state data;

after storing the initial link-state data, receiving a hello message that indicates a direct connection with a different apparatus on one network segment;

determining whether establishing an adjacency relationship with the different apparatus is sufficiently valuable based on the initial link-state data;

if it is determined that establishing an adjacency relationship with the different apparatus is not sufficiently valuable, then not establishing an adjacency relationship with the different apparatus in response to the hello message in link-state data stored in the computer-readable medium; and determining a routing table for shortest path first routing of a data packet traversing the network based on an adjacency relationship indicated in the link-state data stored in the computer-readable medium.

21. An apparatus as recited in claim 20, wherein execution of the one or mores sequences of instructions further causes the one or more processors to carry out the steps of, if it is determined that establishing an adjacency relationship with the different apparatus is sufficiently valuable, then:

establishing an adjacency relationship with the different apparatus by storing link-state data for a link with the different apparatus;

determining whether maintaining an adjacency relationship with a third router different from the apparatus and the different apparatus is sufficiently valuable; and if it is determined that maintaining the adjacency relationship with the third apparatus is not sufficiently valuable, then disestablishing an adjacency relationship with the third router in response to the hello message.

22. An apparatus as recited in claim 20, said step of determining whether establishing an adjacency relationship with the different apparatus is sufficiently valuable further comprising the steps of:

determining whether the different apparatus provides a path to a network address that can not be reached without the different apparatus; and if it is determined that the different apparatus provides a path to a network address that can not be reached without the different apparatus, then determining that establishing an adjacency relationship with the different apparatus is sufficiently valuable.

23. An apparatus as recited in claim 22, said step of determining whether the different apparatus provides a path to a network address that can not be reached without the different apparatus further comprising the step of determining whether the apparatus and the different apparatus are not already transitively synchronized, wherein the apparatus and the different apparatus are transitively synchronized when the link-state data stored on the apparatus includes data from a link-state advertisement control plane message received from the different apparatus.

24. An apparatus as recited in claim 22, said step of determining whether establishing an adjacency relationship with the different apparatus is sufficiently valuable further comprising the step of, if it is determined that the different apparatus provides a path only to one or more network addresses that can be reached without the different apparatus, then determining that establishing an adjacency relationship with the different apparatus is not sufficiently valuable.

25. An apparatus as recited in claim 20, said step of determining whether establishing an adjacency relationship with the different apparatus is sufficiently valuable further comprising the steps of:

determining that a network address can only be reached through a particular number of peers other than the different apparatus, wherein a peer is a router with which the apparatus has an adjacency relationship;

determining whether the particular number of peers is less than a target number that supports a particular degree of redundancy; and if it is determined that the particular number of peers is less than a target number, then determining that establishing an adjacency relationship with the different apparatus is sufficiently valuable.

26. An apparatus as recited in claim 25, said step of determining whether establishing an adjacency relationship with the different apparatus is sufficiently valuable further comprising the steps of, if it is determined that the particular number of peers is not less than a target number, then determining that establishing an adjacency relationship with the different apparatus is not sufficiently valuable.

27. An apparatus as recited in claim 20, said step of determining whether establishing an adjacency relationship with the different apparatus is sufficiently valuable further comprising the steps of:

determining an indirect cost that indicates a measure of network resources consumed along a lowest cost indirect path to the different apparatus;

determining a link cost that indicates a measure of network resources consumed along a direct path to the different apparatus;

determining whether a difference of the indirect cost minus the link cost exceeds a threshold cost difference; and if it is determined that the difference exceeds the threshold cost difference, then determining that establishing an adjacency relationship with the different apparatus is sufficiently valuable.

28. An apparatus as recited in claim 27, said step of determining whether establishing an adjacency relationship with the different apparatus is sufficiently valuable further comprising the step of, if it is determined that the difference does not exceed the threshold cost difference, then determining that establishing an adjacency relationship with the different apparatus is not sufficiently valuable.

29. An apparatus as recited in claim 21, said step of determining whether maintaining an adjacency relationship with the third router is sufficiently valuable further3 comprising the steps of:

determining whether the third router provides a path to a network address that can not be reached without the third router; and if it is determined that the third router provides a path to a network address that can not be reached without the third router, then determining that maintaining an adjacency relationship with the third router is sufficiently valuable.

30. An apparatus as recited in claim 21, said step of determining whether maintaining an adjacency relationship with the third router is sufficiently valuable further comprising the steps of:

determining that a network address can only be reached through a particular number of peers other than the third router, wherein a peer is a router with which the apparatus has an adjacency relationship;

determining whether the particular number of peers is less than a target number that supports a particular degree of redundancy; and if it is determined that the particular number of peers is less than a target number, then determining that maintaining an adjacency relationship with the third router is sufficiently valuable.

31. An apparatus as recited in claim 21, said step of determining whether maintaining an adjacency relationship with the third router is sufficiently valuable further comprising the steps of:

determining an indirect path cost that indicates a measure of network resources consumed along a least costly indirect path from the apparatus to the third router;

determining a link cost that indicates a measure of network resources consumed along a direct path to the different apparatus;

determining whether a difference of the indirect cost minus the link cost exceeds a threshold cost difference; and if it is determined that the difference exceeds the threshold cost difference, then determining that maintaining an adjacency relationship with the third router is sufficiently valuable.

* * * * *